United States Patent
Salvo Lillo et al.

(10) Patent No.: US 12,549,003 B2
(45) Date of Patent: Feb. 10, 2026

(54) INTRINSIC BIASING METHOD FOR A DUAL DC/DC CONVERTER

(71) Applicant: Power Electronics España, S.L., Lliria (ES)

(72) Inventors: David Salvo Lillo, Lliria (ES); Abelardo Salvo Lillo, Lliria (ES); Josué Juan Aguilar, Lliria (ES); Jose Luis Camps Soriano, Lliria (ES)

(73) Assignee: Power Electronics España, S.L., Valencia (ES)

( * ) Notice: Subject to any disclaimer, the term of this patent is extended or adjusted under 35 U.S.C. 154(b) by 401 days.

(21) Appl. No.: 18/130,928

(22) Filed: Apr. 5, 2023

(65) Prior Publication Data

US 2023/0327433 A1   Oct. 12, 2023

(30) Foreign Application Priority Data

Apr. 6, 2022   (ES) .................. ES202230307

(51) Int. Cl.
  *H02J 1/10*   (2006.01)
  *H02J 1/102*  (2026.01)
  *H02J 3/32*   (2006.01)

(52) U.S. Cl.
  CPC .............. *H02J 1/102* (2013.01); *H02J 3/32* (2013.01); *H02J 2300/24* (2020.01)

(58) Field of Classification Search
  CPC ........... H02J 1/102; H02J 3/32; H02J 2300/24
  See application file for complete search history.

(56) References Cited

U.S. PATENT DOCUMENTS

| 9,595,871 B1* | 3/2017 | Bayer | H02M 3/1582 |
| 11,916,511 B1* | 2/2024 | Atcitty | H02J 7/35 |
| 2013/0201732 A1* | 8/2013 | Barauna | H02M 5/458 |
| | | | 363/37 |

(Continued)

FOREIGN PATENT DOCUMENTS

| CN | 103684028 A | * | 3/2014 |
| CN | 206698111 U | * | 12/2017 |

(Continued)

OTHER PUBLICATIONS

Sokol, Yevgen et al., "Full Soft Switching Dual DC/DC Converter With Four-Quadant Switch for Systems With Battery Energy Storage System", 2018 IEEE 3rd International Conference on Intelligent Energy and Power Systems (IEPS), Oct. 9, 2018, pp. 155-160, DOI: 10.1109/IEPS.2018.8559490.

*Primary Examiner* — Usmaan Saeed
(74) *Attorney, Agent, or Firm* — The Webb Law Firm

(57) ABSTRACT

The present invention refers to a method of intrinsically biasing a dual DC/DC converter by means of an active pre-charging of the internal side of the converter prior to its connection with the batteries and a soft biasing of the batteries after the connection of the converter with the batteries. This has the advantage of having a dual DC/DC converter capable of charging isolated batteries in photovoltaic installations in a pole to ground configuration, eliminating the biasing transient that occurs when connecting the battery by means of passive resistive soft charging to the internal capacitor bus of the DC/DC converter, and also eliminating the biasing transient that occurs when starting the DC/DC converter for its normal operation.

7 Claims, 5 Drawing Sheets

(56) References Cited

U.S. PATENT DOCUMENTS

| | | | |
|---|---|---|---|
| 2014/0368170 A1* | 12/2014 | Tang | B60L 53/14 |
| | | | 320/137 |
| 2015/0251542 A1* | 9/2015 | Mensah-Brown | B60L 50/40 |
| | | | 307/10.1 |
| 2019/0190400 A1* | 6/2019 | Vanderzaden | H02S 40/32 |
| 2020/0122582 A1* | 4/2020 | Curuvija | B60L 50/40 |
| 2020/0313443 A1* | 10/2020 | ElMenshawy | H02M 3/33584 |
| 2021/0194353 A1* | 6/2021 | Thomas | H02M 7/2173 |
| 2021/0376613 A1* | 12/2021 | Cummings | H02J 7/007 |
| 2022/0077782 A1* | 3/2022 | Salvo Lillo | H02M 1/14 |
| 2022/0247177 A1* | 8/2022 | Salvo Lillo | H02M 7/44 |
| 2022/0376624 A1* | 11/2022 | Bae | H02M 3/1584 |
| 2024/0079880 A1* | 3/2024 | Salvo Lillo | H02M 1/0077 |

FOREIGN PATENT DOCUMENTS

| | | | | |
|---|---|---|---|---|
| CN | 110138066 A | | 8/2019 | |
| CN | 110535173 A | * | 12/2019 | ............... H02J 3/32 |
| CN | 110611447 A | * | 12/2019 | ............ H02M 7/483 |
| CN | 212969477 U | * | 4/2021 | |
| CN | 112953208 A | * | 6/2021 | ............ H02M 3/156 |
| CN | 215222016 U | | 12/2021 | |
| CN | 114223105 A | * | 3/2022 | .............. H02J 9/062 |
| EP | 3361591 A1 | * | 8/2018 | ............. H02S 40/34 |
| EP | 3514911 B1 | * | 7/2020 | .............. H02J 3/381 |
| WO | WO-2013097803 A1 | * | 7/2013 | .............. B60L 50/60 |
| WO | 2021010570 A1 | | 1/2021 | |

\* cited by examiner

INTRINSIC BIASING METHOD FOR A DUAL DC/DC CONVERTER

CROSS-REFERENCE TO RELATED APPLICATION

This application claims priority to Spanish Patent Application No. P202230307 filed Apr. 6, 2022, the disclosure of which is hereby incorporated by reference in its entirety.

BACKGROUND OF THE INVENTION

Field of the Invention

The present invention is part of the operation in differential DC/DC converters without galvanic isolation connected to batteries and a photovoltaic solar field as a DC source.

The technical field of the invention falls within the field of voltage conversion and especially within the conversion of high voltages with high currents as occurs in power converters, motor controllers and solar and wind power generation systems.

Description of Related Art

Dual DC/DC power converters, like the one shown in FIG. 1, are differential DC/DC type converters that are commonly used to charge battery racks with energy from photovoltaic solar fields.

In the renewable energy generation industry using photovoltaic solar fields, there are two grounding configurations for photovoltaic panels: isolated from ground (known as isolated pole configuration) or connecting the negative pole of the photovoltaic panels to ground (known as pole to ground configuration).

The pole to ground configuration presents differences with respect to the isolated pole configuration. To mention one advantage, the pole to ground configuration avoids the potential induced degradation (PID) when there is no irradiance. PID is a degradation that occurs in photovoltaic panels due to the presence of stray currents that causes a loss of performance in the panels. Its potential effect can reduce panel power by up to 30%.

In addition to this advantage, some regulations, such as those of North America or Japan, require photovoltaic energy generating companies to use the pole to ground configuration in their plants for electrical safety reasons.

This is at odds with battery manufacturers, as most commercial battery racks out there today recommend an isolated pole configuration.

Therefore, differential DC/DC power converters are used to interconnect ungrounded battery racks with grounded photovoltaic solar fields. To handle large power values, dual DC/DC converters are used, which have several drawbacks. The most important drawbacks are the biasing transient when connecting the batteries to the internal capacitor bus of the dual DC/DC converter and the biasing transient when starting the dual DC/DC converter for its normal operation.

Regarding the transient that is generated when starting the dual DC/DC converter for its normal operation, since they are non-isolated converters, when stopped there is a potential difference that is forcibly equalized when the dual DC/DC converter starts to work. Therefore, on the side of the dual DC/DC converter that is not connected to ground (battery side) a voltage and current transient is caused until the voltages of the photovoltaic solar field and the batteries are equal. If, for example, the photovoltaic solar field has a positive voltage of 1000 volts and a negative voltage of 0 volts because it is grounded, and the batteries have a positive voltage of 500 volts and a negative voltage of −500 volts, both with respect to ground, because they are isolated, when the DC/DC converter starts to work, a transient will occur inside it until the batteries are biased in the same way as the photovoltaic solar field. That is, a transient will occur until the batteries are at a positive voltage of 1000 volts and a negative voltage of 0 volts with respect to ground.

The solution in the prior art regarding the transient that is generated when starting the dual DC/DC converter for its normal operation is to size its components (resistors, capacitors, transistors shown in FIG. 1) so that they are able to withstand the voltage and current peaks that are generated during the transient.

With respect to the transient that is generated when connecting the battery rack to the internal capacitor bus of the dual DC/DC converter, a connection by means of a resistor known as a "resistive-passive soft charge" is known in the prior art. The application from the prior art consists of a resistor "$R_{SC}$" (see FIG. 3) connected between the internal side of the DC/DC converter and the batteries.

The problem that occurs with the solution from the prior art is that a transient occurs when the soft charge contactors close, since the internal bus on the battery side (FIGS. 3-12) will not be at the same potential as the batteries (FIGS. 3-20). For example, if the internal bus on the battery side starts discharged "0 volts" it is impossible for both potentials "BSS+" and "BSS−" to coincide (see FIG. 3). Additionally, there is an extra current peak that can affect the soft charge. In FIG. 2, the BSS+ voltage (differential voltage on the battery internal side) and the BSS− voltage (potential with respect to ground of the negative of the battery internal side) can be observed.

Due to all of the above, the need arises to create a solution that allows having a dual DC/DC converter capable of working on the pole to ground photovoltaic panel side and on the battery side working with isolated poles preventing transients of this type, which would allow the sizing of the dual DC/DC converter for normal operating voltages and currents, reducing the weight of the converters and their manufacturing costs.

OBJECT OF THE INVENTION

The present invention provides a solution to the above problem by means of a method that pre-charges and biases the dual DC/DC converter so that when the dual DC/DC converter starts to work normally, the batteries "BSS" and the photovoltaic solar field "PV" are at the same voltage with respect to ground. The solution provided allows a non-isolated dual DC/DC converter to operate safely and without causing damage in a photovoltaic solar field "PV" with pole to ground configuration and floating batteries "BSS" (isolated poles). That is, the solution provided eliminates both transients due to biasing that are produced in dual DC/DC converters in the prior art.

SUMMARY OF THE INVENTION

The present invention discloses an intrinsic biasing method for a dual DC/DC converter that is capable of eliminating the biasing transient when connecting the battery rack to the internal bus of the dual DC/DC converter and the biasing transient when starting the dual DC/DC converter for normal operation.

The dual DC/DC converter topology comprises at least one internal bus on the photovoltaic solar field side and one internal bus on the battery side.

The internal bus on the photovoltaic solar field side in turn comprises: a first transistor, a second transistor, a third transistor, and a fourth transistor, connected in series. Additionally, the internal bus on the photovoltaic solar field side comprises resistors and capacitors connected in series. The transistors connected in series are connected in parallel to the resistors and capacitors connected in series. Furthermore, the internal bus on the photovoltaic solar field side is connectable to a photovoltaic solar field by means of second closure means.

Moreover, the internal bus on the battery side in turn comprises: a fifth transistor, a sixth transistor, a seventh transistor and an eighth transistor connected in series. Additionally, the internal bus on the battery side comprises resistors and capacitors connected in series. The transistors connected in series are connected in parallel to the resistors and capacitors connected in series. The internal bus on the battery side is connectable to a battery rack by means of first closure means.

The first and second closure means may be contactors. Additionally, the first closure means may comprise a resistor "$R_{SC}$" in series with the contactor to carry out the passive soft charging known in the prior art.

The dual DC/DC converter may comprise RFI filters that filter out high frequencies. RFI filters connect the internal bus on the battery side to ground. RFI filters may comprise several capacitors and a resistor in parallel, and a resistor in series to link the filter to the internal bus on the battery side.

The dual DC/DC converter may comprise control means connected to at least: the first transistor, the second transistor, the third transistor, the fourth transistor, the fifth transistor, the sixth transistor, the seventh transistor, the eighth transistor, the first closure means, the second closure means, wherein the control means are configured to carry out the intrinsic biasing method of the present invention detailed below. The control means can be selected from among a microcontroller, a microprocessor and an FPGA.

For the dual DC/DC converter topology described above, the intrinsic biasing method of the present invention comprises the following steps:

i) connecting the dual DC/DC converter with the photovoltaic solar field by closing the second closure means and isolating the DC/DC converter from the battery rack by opening the first closure means;

ii) pre-charging the internal bus on the battery side at the same voltage with respect to ground that the battery rack has with energy from the photovoltaic solar field by means of predefined switching of (all) the transistors;

iii) isolating the internal bus on the battery side from the internal bus on the photovoltaic solar field side until the internal bus on the battery side is biased equal to the battery rack (=changing the internal bus on the battery side in differential mode with negative to ground in differential mode where the positive and negative sides are equidistant from ground), leaving the transistors of the internal bus on the photovoltaic solar field side open;

iv) connecting the internal bus on the battery side with the battery rack, closing the first closure means;

v) opening the first transistor, the fourth transistor, the fifth transistor and the eighth transistor;

vi) biasing the internal bus on the battery side (and therefore also the battery rack because they are connected) at a voltage with respect to ground by means of synchronized switching of the second transistor, the third transistor, the sixth transistor and the seventh transistor, wherein the switching of the transistors is carried out in periods of time "T" with increasing duty cycles in time increments from a minimum value equivalent to the switching time of the transistors to a maximum value where the transistors are closed, so that there is no transfer of energy between the internal sides of the converter since what little energy is generated in the switching will be dissipated in the resistors and coils that link both internal sides.

In one embodiment, step ii) further comprises the dual DC/DC converter working as a buck type converter when the voltage in the battery rack is lower than the voltage in the photovoltaic solar field. Therefore, for the dual DC/DC converter to work as a buck type converter, the predefined switching of step ii) of the method of the present invention comprises at least:

opening the sixth transistor and the seventh transistor;
closing the fifth transistor and the eighth transistor; and
switching the first transistor, the second transistor, the third transistor, and the fourth transistor.

In one embodiment, step ii) further comprises the dual DC/DC converter working as a boost type converter when the voltage in the battery rack is higher than the voltage in the photovoltaic solar field. Therefore, for the dual DC/DC converter to work as a boost type converter, the predefined switching of step ii) of the method of the present invention comprises at least:

opening the second transistor and the third transistor;
closing the first transistor and the fourth transistor; and
switching the fifth transistor, the sixth transistor, the seventh transistor and the eighth transistor.

Throughout this specification, the terms "battery", "batteries" and "battery rack" will be understood as being equivalent.

DESCRIPTION OF THE INVENTION

Figure 1:
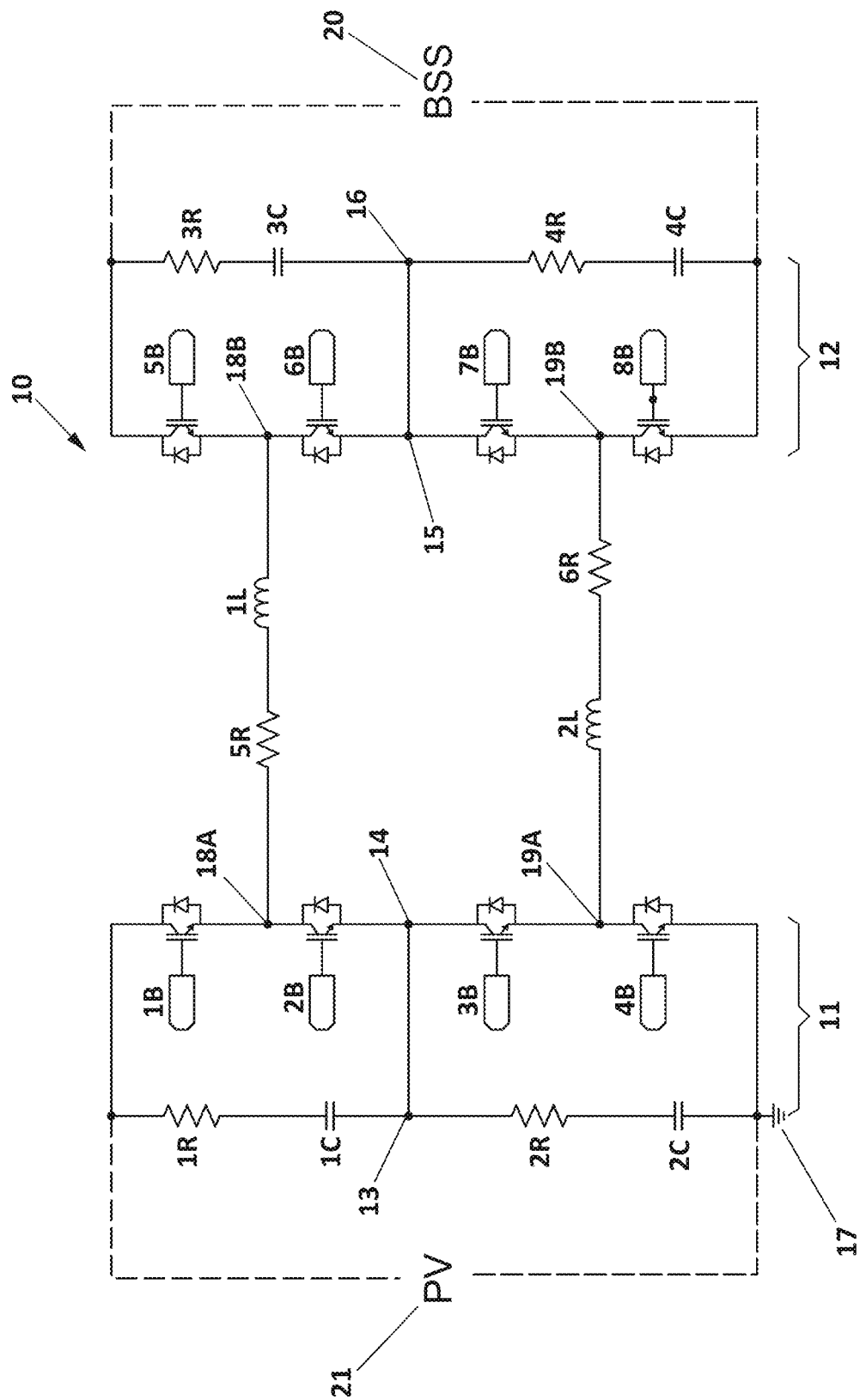
FIG. 1 shows a "dual" type differential DC/DC converter connected to a photovoltaic solar field and a battery rack.

FIG. 1 shows a "dual" type differential DC/DC converter 10 connected to a photovoltaic solar field "PV" 21 and a battery rack "BSS" 20. The dual DC/DC converter 10 has the internal bus on the photovoltaic solar field side 11 and the internal bus on the battery side 12.

The internal bus on the photovoltaic solar field side 11 has the first transistor 1B, the second transistor 2B, the third transistor 3B and the fourth transistor 4B connected in series. Additionally, the internal bus on the photovoltaic solar field side 11 has the first resistor 1R, the first capacitor 1C, the second resistor 2R and the second capacitor 2C connected in series, which in turn are connected in parallel to the four transistors 1B-4B, as shown in FIG. 1. In FIG. 1 it is also be observed that the midpoint 14 of the branch of the four transistors 1B-4B is connected to the midpoint 13 of the branch of the capacitors and resistors 1R-1C-2R-2C. The internal bus on the photovoltaic solar field side 11 is connected to ground 17, which results in the "pole to ground configuration" of the photovoltaic solar field side 21.

The internal bus on the battery side 12 has the fifth transistor 5B, the sixth transistor 6B, the seventh transistor 7B and the eighth transistor 8B connected in series. Additionally, the internal bus on the battery side 12 has the third resistor 3R, the third capacitor 3C, the fourth resistor 4R and the fourth capacitor 4C connected in series, which in turn are connected in parallel to the four transistors 5B,6B,7B,8B, as shown in FIG. 1. In FIG. 1 it is also be observed that the midpoint 15 of the branch of the four transistors 5B-8B is connected to the midpoint 16 of the branch of the capacitors and resistors 3R-3C-4R-4C. The internal bus on the battery side 12 is not connected to ground, which results in the "isolated pole configuration" of the battery side 20.

Finally, in FIG. 1, it can be observed that the internal bus on the photovoltaic solar field side 11 and the internal bus on the battery side 12 are connected to each other by coils and resistors. Specifically, the connection point 18A between the first transistor 1B and the second transistor 2B is connected to the connection point 18B between the fifth transistor 5B and the sixth transistor 6B, by means of the first coil 1L and the fifth resistor 5R. Additionally, the connection point 19A between the third transistor 3B and the fourth transistor 4B is connected to the connection point 19B between the seventh transistor 7B and the eighth transistor 8B, by means of the second coil 2L and the sixth resistor 6R.

Figure 2:
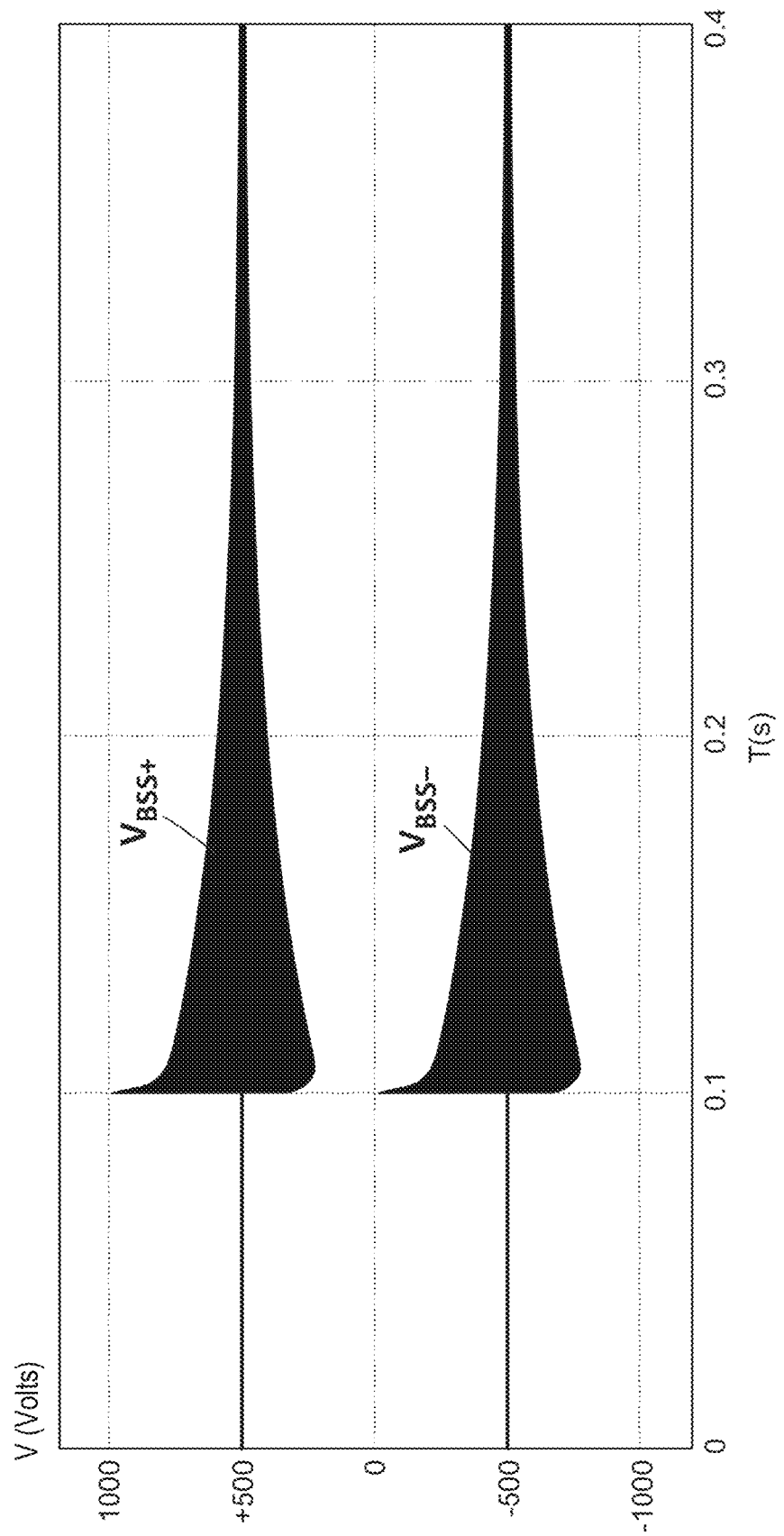
FIG. 2 shows the transients experienced by the positive and negative poles of the battery rack when the dual DC/DC converter of the prior art is connected to the battery rack.

FIG. 2 shows the biasing transients experienced by the positive and negative poles of the battery rack when the dual DC/DC converter from the prior art is connected to the battery rack and these do not occur when applying the method of the present invention.

Figure 3:
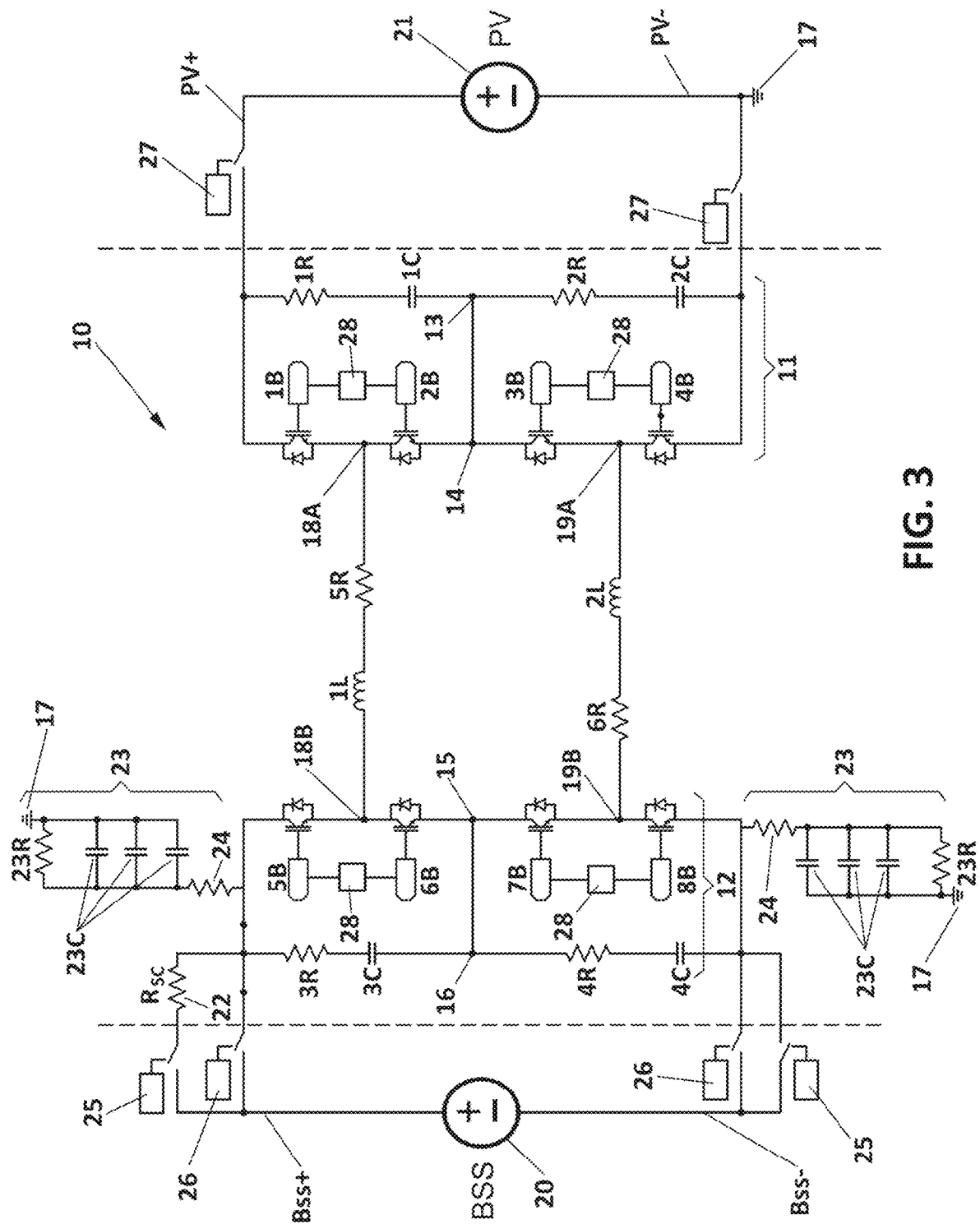
FIG. 3 shows a "dual" type differential DC/DC converter connected to a photovoltaic solar field and a battery rack, where the dual DC/DC converter has a passive soft charge resistor and RFI filters.
Figure 4:
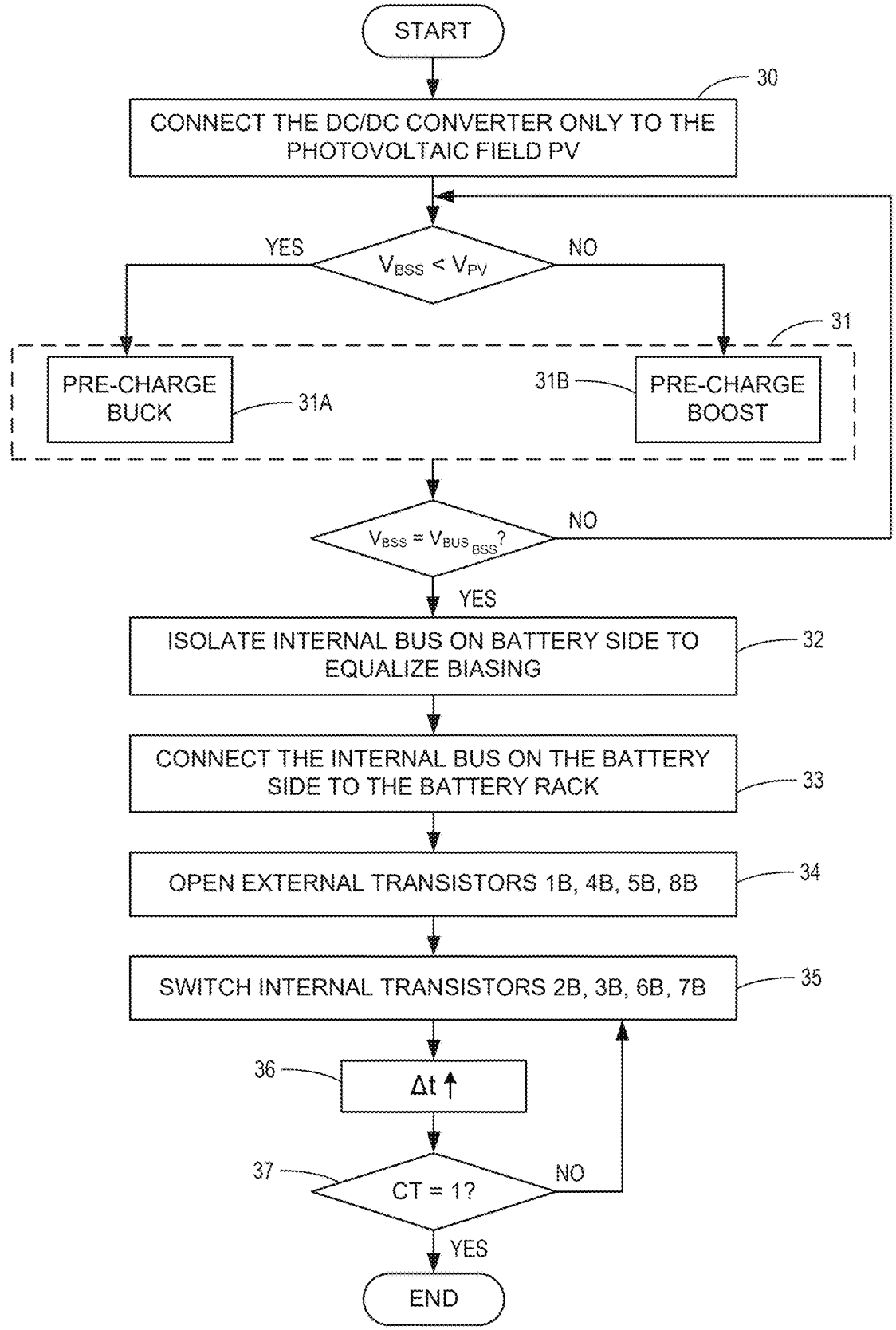
FIG. 4 shows a flowchart of the method of the present invention.
Figure 5:
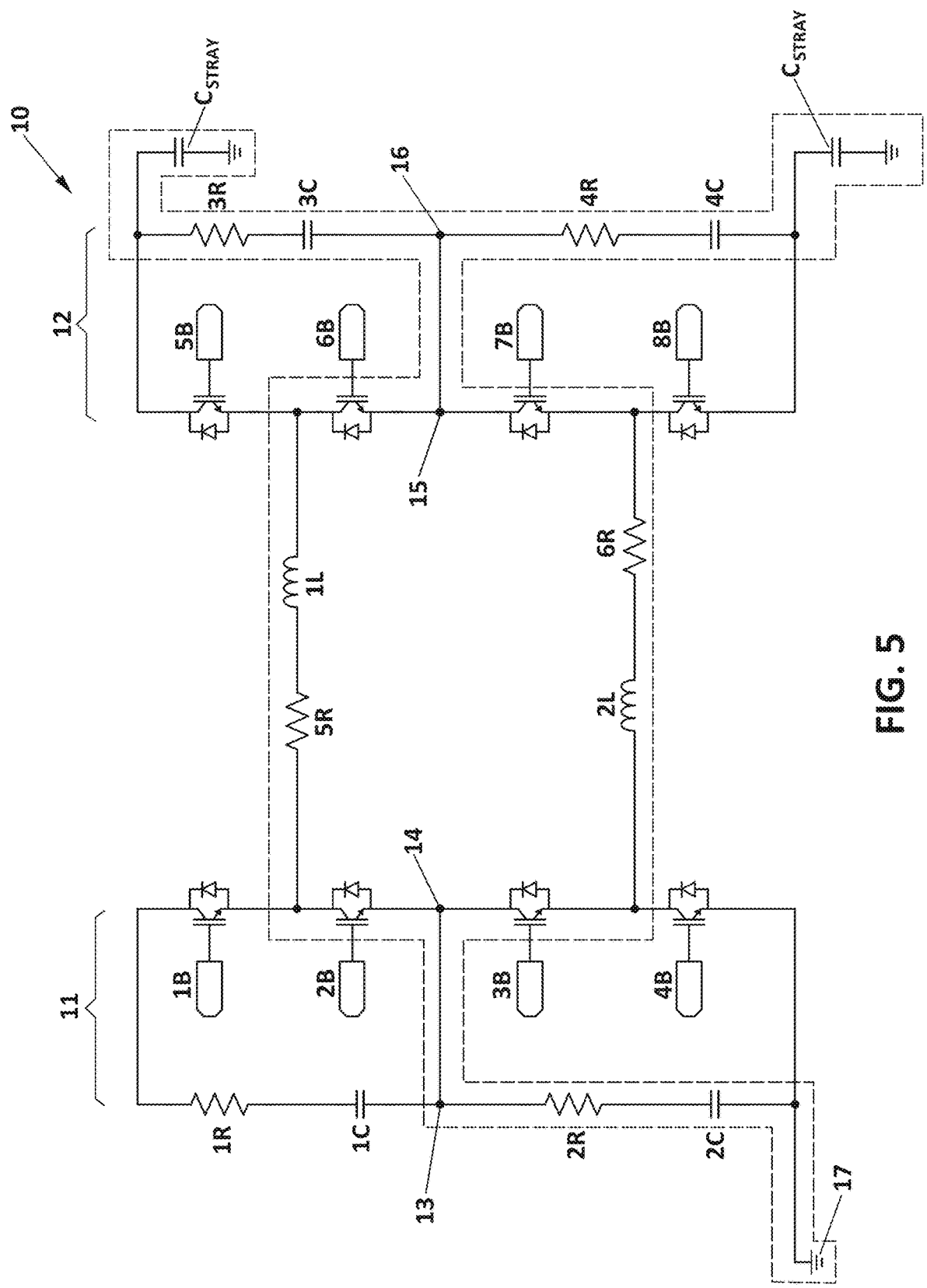
FIG. 5 shows components that are activated to carry out the biasing of the battery rack.

FIG. 3 shows the "dual" type differential DC/DC converter 10 of FIG. 1 connected to the photovoltaic solar field 21 by means of contactors 27. Additionally, the dual DC/DC converter 10 is connected to the battery rack 20 through a soft charge configuration formed by the resistor "$R_{SC}$" 22 and the contactors 25. And once the soft charging has finished, the battery rack 20 is connected to the dual DC/DC converter by means of the contactors 26, as known in the prior art.

Continuing with FIG. 3, it is also known in the prior art that even though the internal bus on the battery side 12 of the dual DC/DC converter is not directly connected to ground in the "isolated poles" configuration, said internal bus on the battery side 12 is connected to ground by means of "RFI" filters 23 in charge of filtering out high frequencies. In the case shown in FIG. 3, the RFI filters are formed by three capacitors 23C and a resistor 23R connected in parallel and by a resistor 24 that connects each branch of the internal bus on the battery side 12 to ground.

For the configuration of a "dual" type differential DC/DC converter 10 as shown in FIGS. 1 and 3, the present invention discloses an intrinsic biasing method for the dual DC/DC converter which, by means of a pre-charging and an internal biasing, is capable of eliminating the biasing transient when connecting the batteries to the internal bus of the dual DC/DC converter and the biasing transient when starting the dual DC/DC converter for normal operation.

Therefore, the method of the present invention comprises performing an active pre-charging of the dual DC/DC converter. First, however, the dual DC/DC converter 10 has to be connected to the photovoltaic solar field "PV" 21 and disconnected from the battery rack "BSS" 20. That is, contactors 27 are closed and contactors 25 and 26 of FIG. 3 are open. Therefore, the first step of the method is to connect (FIG. 4-30) the dual DC/DC converter 10 to the photovoltaic solar field 21 by closing contactor 27 and keeping the DC/DC converter 10 isolated from the battery rack 20 by keeping contactors 25 and 26 open. Next (FIGS. 4-31), active pre-charging is carried out, which comprises equalizing in a controlled and progressive manner the internal voltage (the voltage of the internal buses of batteries 12 and PV 11) with respect to the ground of the dual DC/DC converter 10 at the voltage value which the 20 battery rack has in differential mode equidistant from ground. For example, if the battery rack 20 has a voltage in differential mode of 1000 v (−500 v and +500 v with respect to GND) and the photovoltaic solar field PV 21 has a voltage of 1200 v in differential mode (between 0 v and 1200 v with respect to GND) with respect to ground, the internal buses 11 and 12 of the dual DC/DC converter 10 are pre-charged at 1000 v in differential mode (between 0 v and 1000 v with respect to GND) with respect to ground with energy from the photovoltaic solar field PV 21. Note that the dual DC/DC converter 10 is non-isolated and the biasing of the PV solar field matches that of the internal buses when the transistors of the DC/DC converter switch.

To carry out the transfer of power (energy) from the photovoltaic solar field PV 21 to the internal bus of the batteries 12, for the final transfer to the battery rack 20, it is necessary to know the voltage in the photovoltaic solar field PV 21 and the voltage in the battery rack 20. If the voltage in the battery rack 20 is less than the voltage in the photovoltaic solar field PV 21 ($V_{BSS} < V_{PV}$), the dual DC/DC converter 10 will function as a buck converter 31A where the sixth transistor 6B and the seventh transistor 7B will open, the fifth transistor 5B and the eighth transistor 8B will close, and all transistors will switch (the first transistor 1B, the second transistor 2B, the third transistor 3B, and the fourth transistor 4B) on the photovoltaic solar field PV side, generating a higher voltage at the terminals of inductance 1L than on the battery side to be charged to cause the flow of power.

However, if the voltage in the battery rack 20 is higher than the voltage in the photovoltaic solar field PV 21 ($V_{BSS} > V_{PV}$), the dual DC/DC converter 10 will function as a boost converter 31B. The type of switching of the transistors for the "boost" case will be the opposite of that explained for the "buck" case, where the second transistor 2B and the third transistor 3B will open, the first transistor 1B and the fourth transistor 4B will close, and all the transistors on the battery side will switch (the fifth transistor 5B, the sixth transistor 6B, the seventh transistor 7B and the eighth transistor 8B).

Once the active pre-charging makes the internal voltage (the voltage of the internal buses of batteries 12 and PV 11) of the DC/DC dual 10 in differential mode with respect to ground equal to the voltage value that the battery rack 20 has in differential mode (equidistant from ground), the next step of the method is to isolate (FIG. 4, 32) the internal bus on the battery side 12 from the internal bus on the photovoltaic solar field PV side 11 until the internal bus on the battery side 12 is biased the same as the battery rack 20. That is, to isolate the internal bus on the battery side 12 so that the internal bus on the battery side 12 naturally has the same voltage both in differential mode and with respect to ground ("GND"). In order to isolate the internal bus on the battery side 12, the method comprises leaving the transistors 1B, 2B, 3B and 4B of the internal bus on the photovoltaic solar field side 11 open. Continuing with the previous example, the internal bus on the battery side 12 would have a voltage of 1000 v in differential mode with respect to ground (1000 v-0 v) before isolating the internal bus itself on the battery side 12. By isolating the internal bus on the battery side 12, the internal bus on the battery side 12 naturally maintains the voltage of 1000V in differential mode but modifies its voltage in common mode or with respect to ground (−500 v on GND and +500 v on GND). Taking into account that the differential mode voltage "$V_{DIFF}$" is defined as $V_{DIFF}=V_2-V_1$; and common mode voltage "$V_{MC}$" is defined as $V_{MC}=(V_2+V_1)/2$, the $V_{DIFF}$ is held at 1000 v, but the common mode voltage "$V_{MC}$" goes from 500 v (=(1000−0)/2) to 0 v (=(+500+(−500))/2).

Next, the method comprises connecting (FIG. 4, 33) the internal bus on the battery side 12 with the battery rack 20. Since the internal bus on the battery side 12 has the same voltage and the same biasing as the battery rack 12, the biasing transient that occurred in the prior art when connecting the batteries to the internal bus of the capacitors of the dual DC/DC converter does not occur. To connect the dual DC/DC converter 10 of FIG. 3 to the battery rack 12, "soft charging" is performed by means of closing contactors 25 and resistor 22 as known in the prior art. Subsequently, contactor 26 is closed.

At this point, the internal bus on the battery side 12 will be biased in differential mode equidistant from ground and the internal bus on the photovoltaic solar field side 11 will be biased in differential mode with respect to ground. Continuing with the previous example, the internal bus on the battery side 12 would have a differential voltage of 1000 v, negative pole at −500 v and positive pole at +500 v, and the internal bus on the photovoltaic solar field side 11 would have a differential voltage of 1000 v, positive pole at +1000 v and negative pole at 0 v. This would cause a transient as the converter 10 starts to work normally.

All of the above can be exemplified with the following table:

TABLE 1

| State | Description | Switching | BSS internal voltage | BSS voltage | Contactors |
|---|---|---|---|---|---|
| Prior art | | | | | |
| Off | Converter stopped | No switching | Negative: GND<br>Midpoint: GND<br>Positive: GND | Negative: −Vbss/2<br>Midpoint: GND<br>Positive: +Vbss/2 | Open |
| Passive soft charge | Converter stopped | No switching | With transient:<br>Negative: −Vbss/2<br>Midpoint: GND<br>Positive: +Vbss/2 | With transient:<br>Negative: −Vbss/2<br>Midpoint: GND<br>Positive: +Vbss/2 | Closed |
| Present invention | | | | | |
| Off | Converter stopped | No switching | Negative: GND<br>Midpoint: GND<br>Positive: GND | Negative: −Vbss/2<br>Midpoint: GND<br>Positive: +Vbss/2 | Open |
| On | Converter working | The following transistors switch in pairs:<br>1B-4B/2B-3B<br>5B-8B/6B-7B | Negative: +Vpv/2<br>Midpoint: +Vpv/2<br>Positive: +Vpv/2 | Negative: −Vbss/2<br>Midpoint: GND<br>Positive: +Vbss/2 | Open |
| Active soft charge | | | Negative: +Vpv/2-Vbss/2<br>Midpoint: +Vpv/2<br>Positive: +Vpv/2+Vbss/2 | Negative: −Vbss/2<br>Midpoint: GND<br>Positive: Vbss/2 | Open |
| Standby | Converter stopped | No switching | After the transient:<br>Negative: −Vbss/2<br>Midpoint: GND<br>Positive: +Vbss/2 | Negative: −Vbss/2<br>Midpoint: GND<br>Positive: +Vbss/2 | Open |
| Passive soft charge | Converter stopped | No switching | Negative: −Vbss/2<br>Midpoint: GND<br>Positive: +Vbss/2 | Negative: −Vbss/2<br>Midpoint: GND<br>Positive: +Vbss/2 | Closed |

To avoid the "start-up" transient, the present invention proposes biasing the battery rack 20 in order to equalize the voltages with respect to ground "GND" before starting operation ("ON"). Biasing mainly consists of switching the power transistors in a position that does not generate a transfer of power. To do this, specific transistors are switched with a duty cycle which is as small as possible and progressive, but which progressively equalizes the potentials on both internal sides (11,12) of the dual DC/DC converter.

Before starting the biasing of the battery rack 20, it is necessary to open (FIG. 4-34) the external transistors (1B, 4B,5B,8B) of the dual DC/DC converter. Once the external transistors (1B,4B,5B,8B) are open, it is possible to switch (FIG. 4-35) the intermediate transistors (2B,3B,6B,7B) with the lowest possible duty cycle until the duty cycle is equal to "1" (FIG. 4-37) with time increments Δt (FIG. 4-36). The minimum duty cycle will be that allowed by the transistor itself depending on the technology with which the power transistor is manufactured. As an example, a time between 1-3115 can be taken as a reference with the use of IGBT type transistors. The duty cycle is progressively increased until leaving the transistors 2B,3B,6B,7B closed, at which time the biasing is complete. This causes the voltages on both internal sides (11,12) of the dual DC/DC converter 10 to begin to progressively equalize in a way that, apart from being very low in terms of energy (because the cycle is the minimum possible and is increased slowly), it is attenuated by the implicit low-pass filter of the inductances between both internal sides (11,12) of the dual DC/DC converter 10 (path marked with a dashed line in FIG. 5 where stray capacitances "C" of the buses are drawn). The time increments Δt in the duty cycle "CT" will depend mainly on the implicit low-pass filter of the inductances and the technology of the power transistors (1B-8B) and they must only meet the condition that there is no transfer of energy between both internal sides (11,12) of the dual DC/DC converter 10. As an example, a time between 1-3115 can be taken as a reference for the time increments Δt with the use of IGBT type transistors.

Below is a comparison between the operation of the dual DC/DC converter according to the prior art and its operation for the biasing of the battery internal side 12, and therefore, of the battery rack 20 when both are connected:

TABLE 2

| State | Description | Switching | PV biasing | BSS biasing |
|---|---|---|---|---|
| Prior art | | | | |
| OFF | Converter stopped | No switching | Negative: GND<br>Midpoint: +Vpv/2<br>Positive: +Vpv | Negative: −Vbss/2<br>Midpoint: GND<br>Positive: +Vbss/2 |
| ON | Converter working in normal mode | The following transistors switch in pairs:<br>1B-4B/2B-3B<br>5B-8B/6B-7B | Negative: GND<br>Midpoint: +Vpv/2<br>Positive: +Vpv | After the transient:<br>Negative: +Vpv/2-Vbss/2<br>Midpoint: +Vpv/2<br>Positive: +Vpv/2+Vbss/2 |
| Present invention | | | | |
| OFF | Converter stopped | No switching | Negative: GND<br>Midpoint: +Vpv/2<br>Positive: +Vpv | Negative: −Vbss/2<br>Positive: +Vbss/2 |
| Biasing | Converter working | The following transistors switch synchronously:<br>2B-3B/6B-7B | Negative: GND<br>Midpoint: +Vpv/2<br>Positive: +Vpv | Smooth transition to:<br>Negative: +Vpv/2-Vbss/2<br>Midpoint: +Vpv/2<br>Positive: +Vpv/2+Vbss/2 |
| ON | Converter working | The following transistors switch in pairs:<br>1B-4B/2B-3B<br>5B-8B/6B-7B | Negative: GND<br>Midpoint: +Vpv/2<br>Positive: +Vpv | Negative: +Vpv/2-Vbss/2<br>Midpoint: +Vpv/2<br>Positive: +Vpv/2+Vbss/2 |

To carry out the intrinsic biasing method for a dual DC/DC converter of the present invention, the dual DC/DC converter comprises control means 28 connected to at least: the first transistor, the second transistor, the third transistor, the fourth transistor, the fifth transistor, the sixth transistor, the seventh transistor, the eighth transistor, the first closure means, the second closure means. The control means can be selected from among a microcontroller, a microprocessor and an FPGA.

The invention claimed is:

1. An intrinsic biasing method for a dual DC/DC converter,
wherein the dual DC/DC converter comprises:
an internal bus on a photovoltaic solar field side which in turn comprises:
a first transistor, a second transistor, a third transistor, and a fourth transistor connected in series;
resistors and capacitors connected in series;
wherein the transistors connected in series are connected in parallel to the resistors and the capacitors connected in series; and wherein the internal bus on the photovoltaic solar field side is connectable to a photovoltaic solar field by means of second closure means;
an internal bus on a battery side which in turn comprises:
a fifth transistor, a sixth transistor, a seventh transistor, and an eighth transistor connected in series;
resistors and capacitors connected in series;
wherein the transistors connected in series are connected in parallel to the resistors and the capacitors connected in series; and wherein the internal bus on the battery side is connectable to a battery rack by means of first closure means;
wherein the method comprises the following steps:

i) connecting the dual DC/DC converter with the photovoltaic solar field by closing the second closure means and isolating the dual DC/DC converter from the battery rack by opening the first closure means;

ii) pre-charging the internal bus on the battery side at the same voltage with respect to ground that the battery rack has with energy from the photovoltaic solar field by means of predefined switching of the transistors of the battery side and the transistors of the photovoltaic solar field side;

iii) isolating the internal bus on the battery side from the internal bus on the photovoltaic solar field side until the internal bus on the battery side is biased equal to the battery rack, leaving the transistors of the internal bus on the photovoltaic solar field side open;

iv) connecting the internal bus on the battery side with the battery rack, closing the first closure means;

v) opening the first transistor, the fourth transistor, the fifth transistor and the eighth transistor;

vi) biasing the internal bus on the battery side at a voltage with respect to ground by means of synchronized switching of the second transistor, the third transistor, the sixth transistor and the seventh transistor, wherein the synchronized switching of the transistors is carried out in periods of time "T" with increasing duty cycles in time increments from a minimum value equivalent to a switching time of the second transistor, the third transistor, the sixth transistor and the seventh transistor to a maximum value where the second transistor, the third transistor, the sixth transistor and the seventh transistor are closed.

2. The method of claim 1, wherein the step ii) additionally comprises the dual DC/DC converter working as a "buck" type converter when a voltage in the battery rack is lower than a voltage in the photovoltaic solar field.

3. The method of claim 1, wherein the step ii) additionally comprises the dual DC/DC converter working as a "boost" type converter when a voltage in the battery rack is higher than a voltage in the photovoltaic solar field.

4. The method of claim 2, wherein the step ii) additionally comprises:
opening the sixth transistor and the seventh transistor;
closing the fifth transistor and the eighth transistor;
switching the first transistor, the second transistor, the third transistor, and the fourth transistor.

5. The method of claim 3, wherein the step ii) additionally comprises:
opening the second transistor and the third transistor;
closing the first transistor and the fourth transistor;
switching the fifth transistor, the sixth transistor, the seventh transistor and the eighth transistor.

6. A dual DC/DC converter comprising:
an internal bus on a photovoltaic solar field side which in turn comprises:
a first transistor, a second transistor, a third transistor, and a fourth transistor connected in series;
resistors and capacitors connected in series;
wherein the transistors connected in series are connected in parallel to the resistors and the capacitors connected in series; and wherein the internal bus on the photovoltaic solar field side is connectable to a photovoltaic solar field by means of second closure means;
an internal bus on a battery side which in turn comprises:
a fifth transistor, a sixth transistor, a seventh transistor, and an eighth transistor connected in series;
resistors and capacitors connected in series;
wherein the transistors connected in series are connected in parallel to the resistors and the capacitors connected in series; and wherein the internal bus on the battery side is connectable to a battery rack by means of first closure means;
wherein the dual DC/DC converter comprises control means connected to at least the first transistor, the second transistor, the third transistor, the fourth transistor, the fifth transistor, the sixth transistor, the seventh transistor, the eighth transistor, the first closure means, the second closure means, wherein the control means are configured to carry out the intrinsic biasing method for the dual DC/DC converter defined in claim 1.

7. The dual DC/DC converter of claim 6, wherein the control means are selected from among a microcontroller, a microprocessor and an FPGA.

* * * * *